(12) United States Patent
Chiao

(10) Patent No.: US 9,089,912 B2
(45) Date of Patent: Jul. 28, 2015

(54) BAND SAW MACHINE WITH A ROD HAVING AN ADJUSTABLE POSITION TO ACCOMMODATE VARIOUS SIZED WORKPIECES

(71) Applicant: EVERISING MACHINE CO., Taichung (TW)

(72) Inventor: Shu-Chia Chiao, Taichung (TW)

(73) Assignee: EVERISING MACHINE CO., Taichung (TW)

( * ) Notice: Subject to any disclaimer, the term of this patent is extended or adjusted under 35 U.S.C. 154(b) by 0 days.

(21) Appl. No.: 14/268,894

(22) Filed: May 2, 2014

(65) Prior Publication Data

US 2014/0352513 A1 Dec. 4, 2014

(30) Foreign Application Priority Data

May 30, 2013 (TW) .............................. 102210102 U

(51) Int. Cl.
*B26D 1/46* (2006.01)
*B23D 55/04* (2006.01)
(Continued)

(52) U.S. Cl.
CPC .............. *B23D 55/04* (2013.01); *B23D 55/082* (2013.01); *B23D 55/084* (2013.01); *B23D 55/086* (2013.01); *B25B 1/24* (2013.01); *B25B 1/2489* (2013.01); *B27B 13/10* (2013.01); *Y10T 83/707* (2015.04); *Y10T 83/7264* (2015.04); *Y10T 83/7493* (2015.04)

(58) Field of Classification Search
CPC ........ B27B 13/10; B25B 1/24; B25B 1/2489; B23D 55/084; B23D 55/086; B23D 55/04; Y10T 83/707

USPC ......... 83/820, 821, 823, 824, 828, 829, 467.1
See application file for complete search history.

(56) References Cited

U.S. PATENT DOCUMENTS 2,679,177 A * 5/1954 Gepfert ........................... 269/30
3,848,493 A * 11/1974 Harris .............................. 83/168
(Continued)

FOREIGN PATENT DOCUMENTS

DE 3027360 A1 * 2/1982
GB 190907739 A * 0/1910
(Continued)

OTHER PUBLICATIONS

English Translation of JP 2774448 aslo published as JPH 0839343.*

*Primary Examiner* — Kenneth E. Peterson
*Assistant Examiner* — Jennifer Swinney
(74) *Attorney, Agent, or Firm* — Patent Office of Bang Shia

(57) ABSTRACT

A band saw machine with a rod having an adjustable position to accommodate various sized workpieces includes a movable member which is mounted on a saw frame and movable relative to a movable clamp arm. The movable member and the fixing member each have a rack, and the racks are in parallel to each other. The rod includes a gear shaft engaged with the racks. When the movable clamp arm moves to accommodate the size of a workpiece, the rack of the movable member drives the gear shaft to move along the rack of the fixing member, which causes position change of the rod, so that the rod is automatically moved to a position where it can detect the workpiece in a reliable manner. Therefore, the size of the workpiece to be clamped is not limited by the position of the rod anymore.

5 Claims, 7 Drawing Sheets

(51) Int. Cl.
  *B27B 13/10* (2006.01)
  *B25B 1/24* (2006.01)
  *B23D 55/08* (2006.01)

(56) References Cited

U.S. PATENT DOCUMENTS 3,920,501 A * 11/1975 Carlton et al. ................ 156/364
4,222,295 A * 9/1980 Sawamura ..................... 83/169
4,558,614 A * 12/1985 Harris ............................. 83/56
4,765,213 A * 8/1988 Kondo ............................. 83/61
2002/0073818 A1* 6/2002 Stolzer ........................... 83/206

FOREIGN PATENT DOCUMENTS

| | | | | | |
|---|---|---|---|---|---|
| JP | 61025718 | A | * | 2/1986 | ............. B23D 53/04 |
| JP | 01078718 | A | * | 3/1989 | ............. B23D 55/08 |
| JP | 2774448 | B2 | * | 7/1998 | |
| JP | 2009248294 | A | * | 10/2009 | |

* cited by examiner

BAND SAW MACHINE WITH A ROD HAVING AN ADJUSTABLE POSITION TO ACCOMMODATE VARIOUS SIZED WORKPIECES

BACKGROUND OF THE INVENTION

1. Field of the Invention

The present invention relates to a band saw machine, and more particularly to a band saw machine with a rod having an adjustable position to accommodate various sized workpieces.

2. Description of the Prior Art

FIG. 1 shows a conventional band saw machine which comprises a saw frame 10, and a band saw 11 which rotatably disposed on the saw frame 10 and can be moved up and down by a quick lifting device 12. In order to detect and control the distance between the saw frame 10 and the workpiece A during cutting process, a quick lifting rod 13 is provided on the saw frame 10, so that, when the saw frame 10 moves down until the quick lifting rod 13 comes into contact with the workpiece A, the workpiece A will push the quick lifting rod 13 upward to trigger a limit switch (not shown), so as to slow down the saw frame 10, and make it ready for follow-up cutting operation.

The position of the quick lifting rod 13 on the saw frame 10 is normally fixed, therefore, the size of the workpieces to be cut will be limited to a certain range, beyond which, the quick lifting rod 13 won't be able to detect the status of the workpiece, which consequently affects the follow-up cutting operation. Besides, in order to stabilize the band saw 11, the band saw machine is usually provided with clamp rollers at both sides of the quick lifting rod 13 to clamp the band saw 11. However, when the workpiece to be clamped is relatively small, interference with the quick lifting rod 13 or the clamp rollers might be produced, or the clamp rollers are unable to stay close to the band saw 11 where the small workpiece is located, which causes wobbling of the band saw 11, adversely affecting the precision of cutting.

The present invention has arisen to mitigate and/or obviate the afore-described disadvantages.

SUMMARY OF THE INVENTION

The primary objective of the present invention is to provide a band saw machine with a rod having an adjustable position to accommodate various sized workpieces.

To achieve the above objective, a band saw machine with a rod having an adjustable position to accommodate various sized workpieces in accordance with the present invention comprises a saw frame, a clamping unit and a lifting rod.

Around the frame is provided a rotatable band saw, on one surface of the saw frame is fixed a fixing member, on the fixing member is fixed a stationary rack which extends along a first direction, and a direction perpendicular to the first direction is defined as a second direction. On the saw frame is movably disposed a movable member which comes into contact with the band saw, and the movable member moves along with the band saw. On the movable member is fixed a bearing and a movable rack which is in parallel with the stationary rack.

The clamping unit is located beside the saw frame and comprises a stationary clamp arm and a movable clamp arm. The movable clamp arm is movable along the first direction and includes a clamp portion and a stop rod formed on the clamp portion. A space between the clamp portion and the stationary clamp arm is provided for clamping workpieces, the stop rod of the movable clamp arm extends along the second direction, and the movable member uses the bearing to stop against the stop rod, so as to restrict a travel of the movable member.

On the rod is pivotally provided a gear shaft, the rod is movable along the first direction and located between the fixing member and the movable member, in a manner that the gear shaft is located between the stationary rack and the movable rack, when the movable member moves, the movable rack drives the gear shaft to move along the stationary rack, and causes the position of the rod to change.

In general, the band saw machine with the rod having an adjustable position to accommodate various sized workpieces in accordance with the present invention is simply structured, wherein the movable clamp arm can be moved to clamp different sized workpieces, meanwhile, the rod is automatically moved to a position where it can detect the workpiece in a reliable manner. Therefore, the size of the workpiece to be clamped by the band saw machine in accordance with the present invention is not limited by the position of the rod anymore, namely, the present invention is capable of dealing with different workpieces over a broader range of size.

DETAILED DESCRIPTION OF THE PREFERRED EMBODIMENTS

Figure 1:
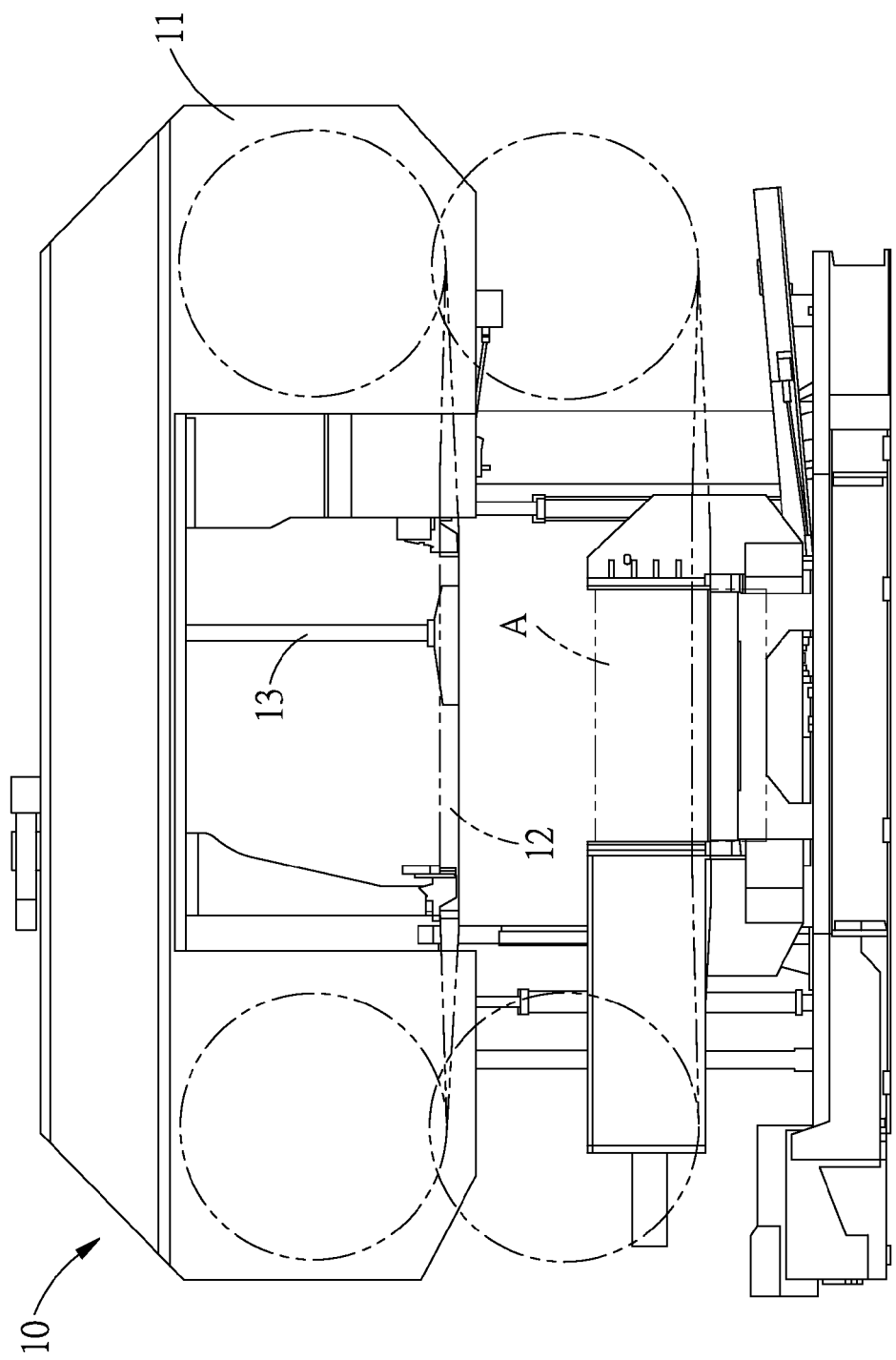
FIG. 1 shows a conventional band saw machine with a stationary lifting rod.

The present invention will be clearer from the following description when viewed together with the accompanying drawings, which show, for purpose of illustrations only, the preferred embodiment in accordance with the present invention.

Referring to FIGS. 2-8, a band saw machine with a rod having an adjustable position to accommodate various sized workpieces in accordance with the present invention comprises: a base 20, a saw frame 30, a clamping unit 40, and the rod 50.

The base 20 is provided with two lifting rods 21.

The saw frame 30 is disposed on the two lifting rods 21 and capable of moving up and down with respect to the lifting rods 21. Around the saw frame 30 is provided a rotatable band saw 31. On a surface of the saw frame 30 is fixed a fixing member 32 with one end contacting the band saw 31. On the fixing member 32 is fixed a stationary rack 321 which extends along a first direction D1, and a direction which is perpendicular to the first direction D1 is defined as a second direction D2. On the saw frame 30 are further provided a pair of rails 33, and each of the rails 33 extends along the first direction D1 and is provided with a movable member 34 whose one end has two sliders 341 movably sleeved onto the rails 33, so that the movable member 34 are disposed on the rails 33 and movable in the first direction D1. Another end of the movable member comes into contact with the band saw 31, and the band saw 31 moves, it can drive the movable member 34 to move. On the surface of the movable member 34 is fixed a bearing 342 and a movable rack 343 which extends in the first direction D1 and is located at a different position in the second direction D2 with respect to the stationary rack 321, namely, the movable rack 343 is in parallel with the stationary rack 321. On another surface of the saw frame 30 is provided another rail 35.

The clamping unit 40 is located beside the saw frame 30 and comprises a stationary clamp arm 41 and a movable clamp arm 42. The stationary clamp arm 41 is abutted against the fixing member 32. The movable clamp arm 42 is movable along the first direction D1 and includes a clamp portion 421 on which being formed a stop rod 422. The workpiece is to be clamped between the clamp portion 421 and the stationary clamp arm 41. The stop rod 422 of the movable clamp arm 42 extends along the second direction D2. When the movable clamp arm 42 moves to a furthest position from the stationary clamp arm 41, the stop rod 422 of the movable clamp arm 42 will be abutted against the bearing 342 of the movable member 34, namely, the movable member 34 uses the bearing 342 to stop against the stop rod 422, so as to restrict the travel of the movable member 34.

On one surface of the rod 50 is disposed a slide block 51, and on another surface of the rod 50 is pivotally provided a gear shaft 52. The slide block 51 is movably sleeved onto the rail 35 of the saw frame 30, so that the rod 50 is disposed on the saw frame 30 and movable along the first direction D1, in such a manner that the rod 50 is located between the fixing member 32 and the movable member 34, the gear shaft 52 is located between the stationary rack 321 and the movable rack 343, and the gear shaft 52 is engaged with the stationary rack 321 and the movable rack 343. When the movable member 34 moves, the movable rack 343 will drive the gear shaft 52 to move along the stationary rack 321, and cause the position of the rod 50 to change.

Figure 2:
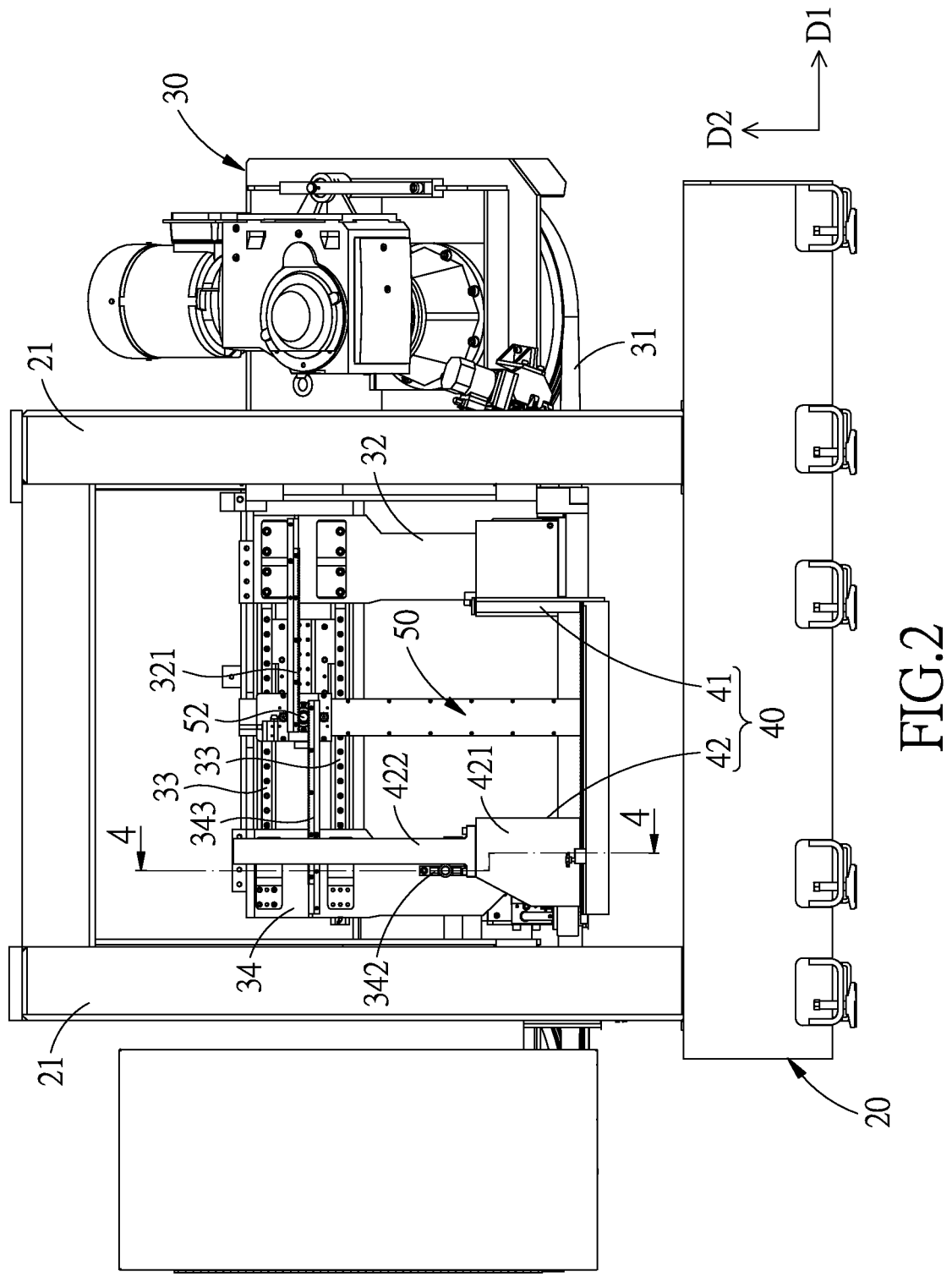
FIG. 2 is a plan view of a band saw machine with a rod having an adjustable position to accommodate various sized workpieces in accordance with the present invention.
Figure 3:
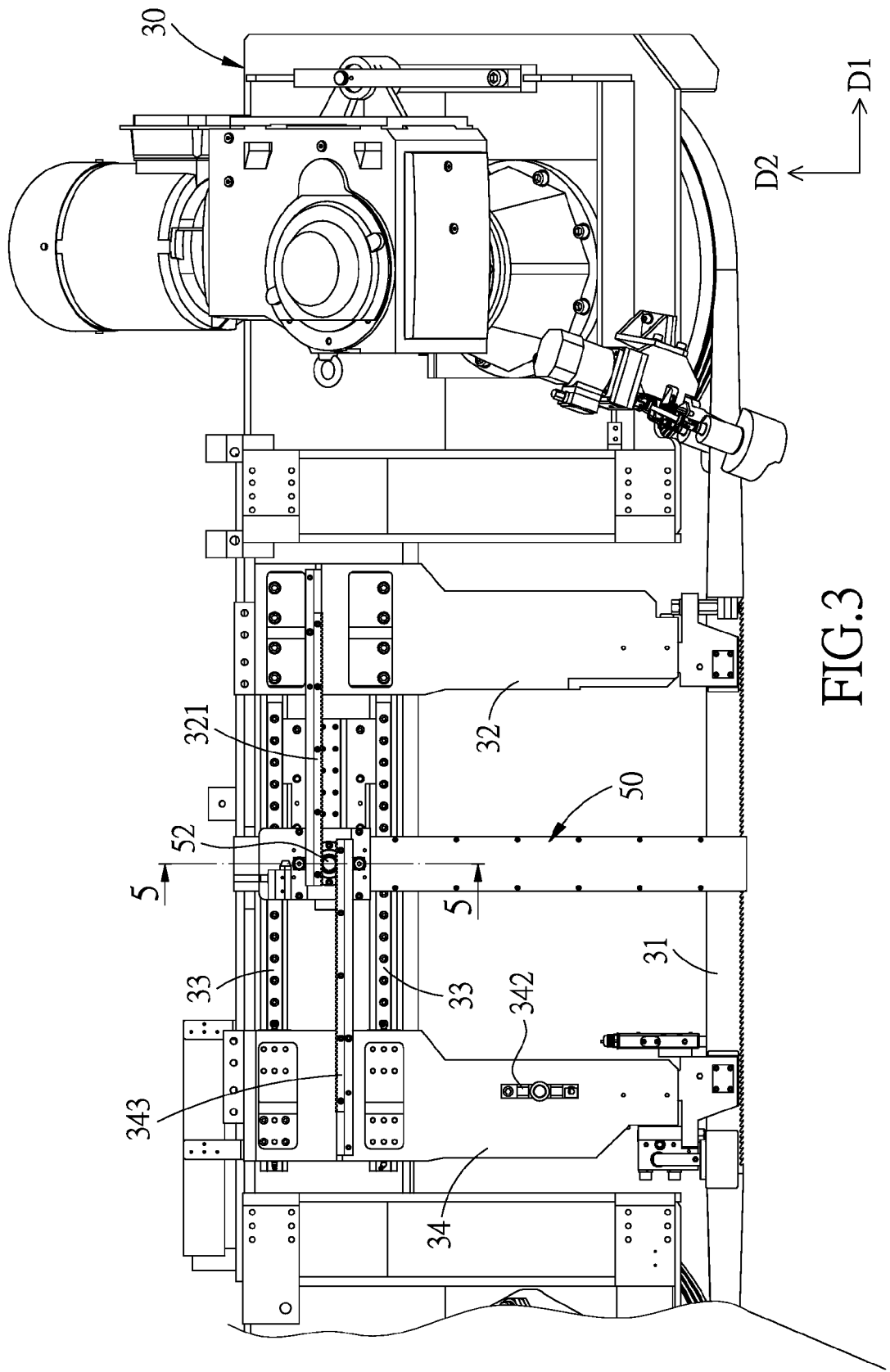
FIG. 3 is a plan view of a part of the band saw machine with the rod having an adjustable position to accommodate various sized workpieces in accordance with the present invention.
Figure 4:
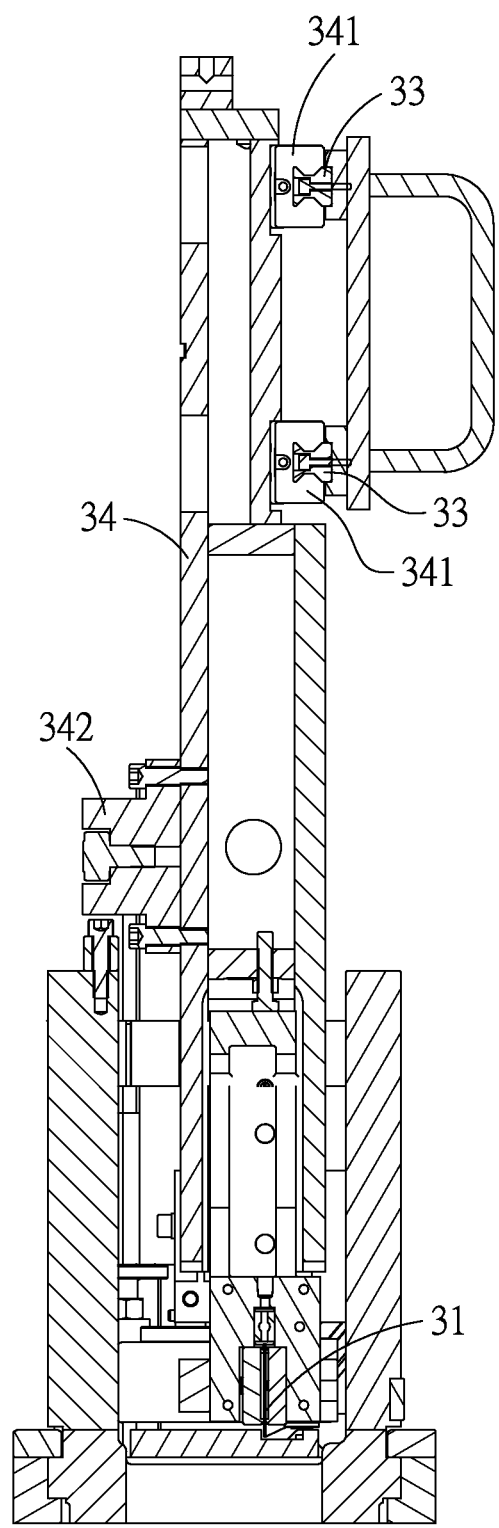
FIG. 4 is a cross sectional view taken along the line 4-4 of FIG. 2.
Figure 5:
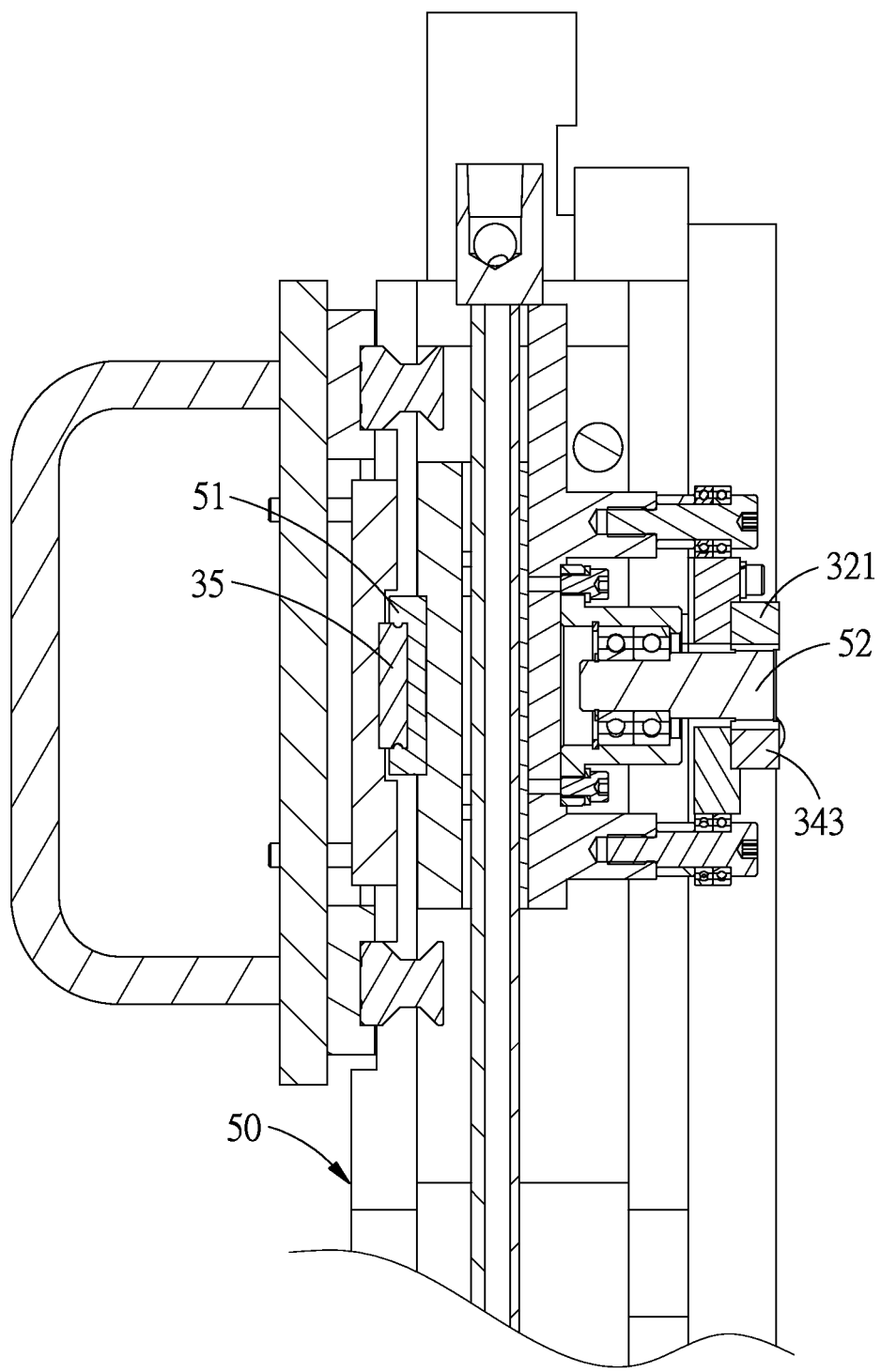
FIG. 5 is a cross sectional view taken along the line 5-5 of FIG. 3.

When the movable clamp arm 42 of the clamping unit 40 is located at a furthest position from the stationary clamp arm 41, as shown in FIG. 2, the space between the movable clamp arm 42 and the stationary clamp arm 41 is provided for clamping a workpiece, and the rod 50 is located at the center of the workpiece, so that it can conveniently and precisely detect the workpiece. At this moment, there are a first initial distance L1 between the fixing member 32 and the movable member 34, and a second initial distance L2 between the rod 50 and the fixing member 32.

Figure 6:
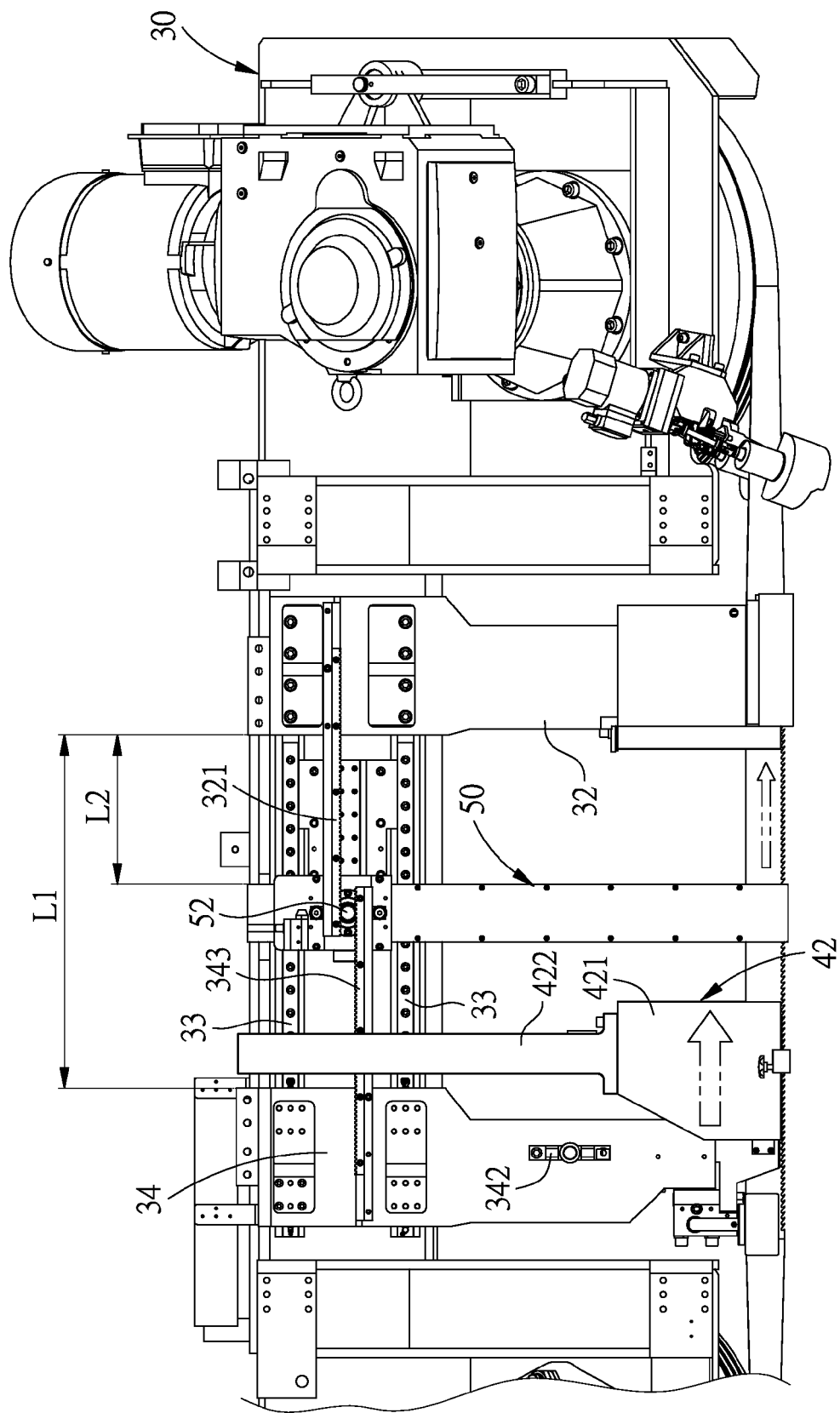
FIG. 6 is an operational view showing the movement of the movable clamp arm of the band saw machine with the rod in accordance with the present invention.

When the workpiece to be clamped is relatively small, as shown in FIG. 6, the movable clamp arm 42 can be controlled to move toward the stationary clamp arm 41, so that the space between the movable clamp arm 42 and the stationary clamp arm 41 is narrowed down to clamp a small workpiece. At this moment, the movable clamp arm 42 also moves away from the bearing 342 of the movable member 34, and then the band saw 31 can be switched on. When the band saw 31 rotates, the movable member 34 will be driven by the band saw 31 to move toward the movable clamp arm 42, and the end point of the travel length of the movable member 34 is where the bearing 342 is stopped against the stop rod 422 of the movable clamp arm 42.

Figure 7:
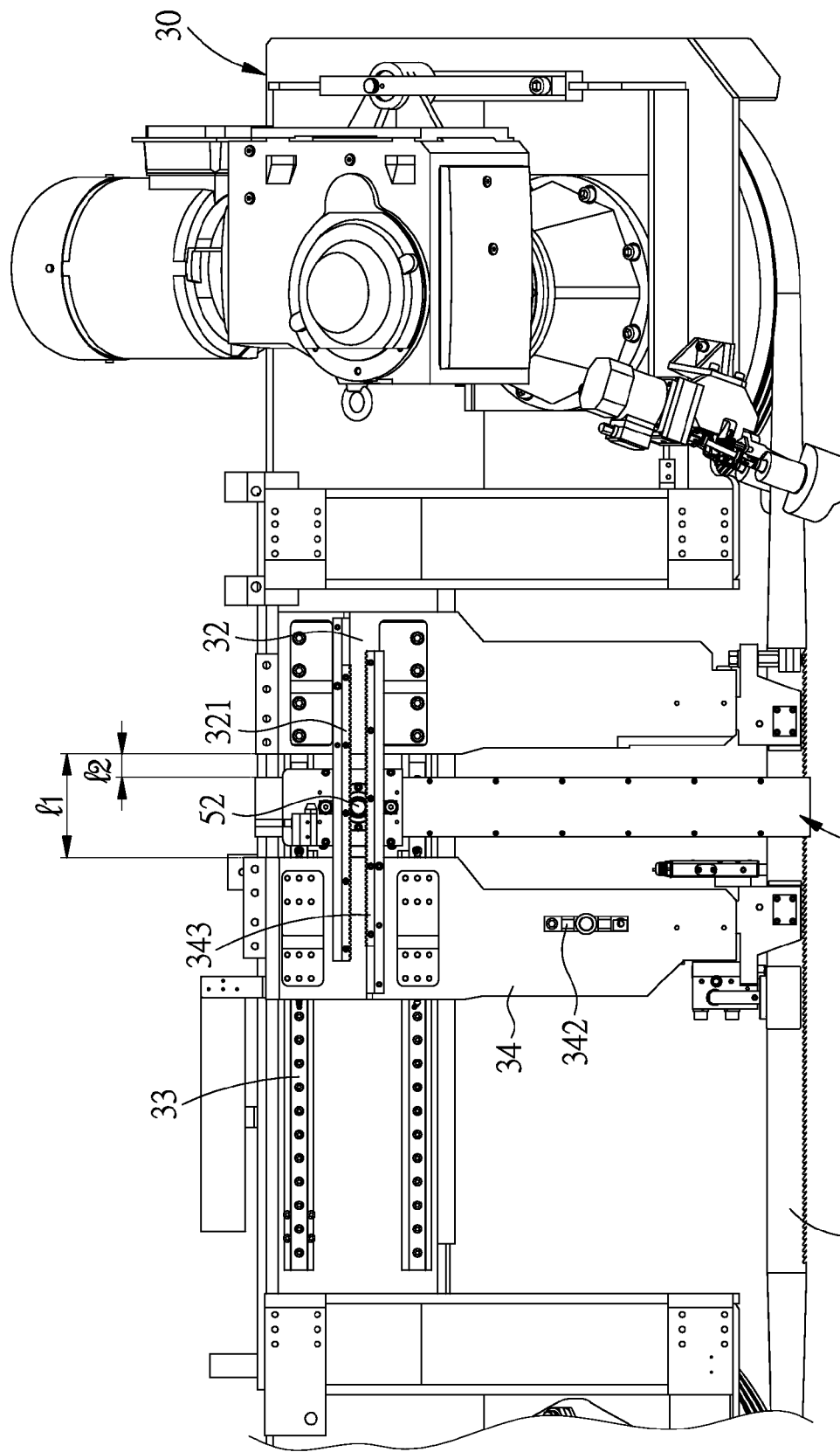
FIG. 7 is another operational view showing the state of the band saw machine with the rod in accordance with the present invention, after the movable member and the rod move to a new position.

When the movable member 34 is moving, the movable rack 343 also moves toward the stationary clamp arm 41, meanwhile, the gear shaft 52 engaged with the movable rack 343 is rotated by the movable rack 343, which causes linear movement of the gear shaft 52 along the stationary rack 321. When the gear shaft 52 linearly moves along the stationary rack 321, the rod 50 will also be caused to move toward the fixing member 32, as shown in FIG. 7. Therefore, the first initial distance L1 between the fixing member 32 and the movable member 34 is narrowed down to a first clamping distance 11, and the second initial distance L2 between the rod 50 and the fixing member 32 is also narrowed down to a second clamping distance 12. By such arrangements, the movable clamp arm 42 can be moved to clamp small workpiece, and when the movable clamp arm 42 moves, the movable member 34 and the rod 50 will also move along with it, as shown in FIG. 7, which ensures that the rod 50 keeps staying at a position where it can detect the workpiece in a reliable manner.

In general, the band saw machine with the rod having an adjustable position to accommodate various sized workpieces in accordance with the present invention is simply structured, wherein the movable clamp arm 42 can be moved to clamp different sized workpieces, meanwhile, the rod 50 is automatically moved to a position where it can detect the workpiece in a reliable manner. Therefore, the size of the workpiece to be clamped by the band saw machine in accordance with the present invention is not limited by the position of the rod 50 anymore, namely, the present invention is capable of dealing with different workpieces over a broader range of size.

While we have shown and described various embodiments in accordance with the present invention, it is clear to those skilled in the art that further embodiments may be made without departing from the scope of the present invention.

What is claimed is:

1. A band saw machine with a rod having an adjustable position to accommodate various sized workpieces comprising:

a saw frame, around which being provided a rotatable band saw, on one surface of the saw frame being fixed a fixing member, on the fixing member being fixed a stationary rack which extends along a first direction, and a direction perpendicular to the first direction being defined as a second direction, on the saw frame being movably disposed a movable member which comes into contact with the band saw, and the movable member moving along with the band saw, on the movable member being fixed a bearing and a movable rack which is in parallel with the stationary rack;

a clamping unit located beside the saw frame and comprising a stationary clamp arm and a movable clamp arm, the movable clamp arm being movable along the first direction and including a clamp portion and a stop rod formed on the clamp portion, a space between the clamp portion and the stationary clamp arm being provided for clamping workpieces, the stop rod of the movable clamp arm extending along the second direction, the movable member using the bearing to stop against the stop rod, so as to restrict a travel of the movable member; and on the rod is pivotally provided a gear shaft, the rod being movable along the first direction and located between the fixing member and the movable member, in a manner that the gear shaft is located between the stationary rack and the movable rack, when the movable member moves, the movable rack drives the gear shaft to move along the stationary rack, and causes the position of the rod to change.

2. The band saw machine with the rod having an adjustable position to accommodate various sized workpieces as claimed in claim 1, wherein a pair of rails are disposed on the saw frame, and each of the rails extends along the first direction, and the movable member is movably disposed on the rails and movable in the first direction.

3. The band saw machine with the rod having an adjustable position to accommodate various sized workpieces as claimed in claim 1, wherein a rail is disposed on another surface of the saw frame, on one surface of the rod is disposed a slide block which is movably sleeved onto the rail of the saw frame, so that the rod is disposed on the saw frame and movable along the first direction.

4. The band saw machine with the rod having an adjustable position to accommodate various sized workpieces as claimed in claim 1, wherein the saw frame is disposed on a base which is provided with two rods, and the saw frame is able to move up and down along the two rods.

5. The band saw machine with the rod having an adjustable position to accommodate various sized workpieces as claimed in claim 1, wherein one end of the fixing member comes into contact with the band saw.

* * * * *